Nov. 8, 1932.　　　　S. BARTON　　　　1,886,624
ROTARY TRANSMISSION OR BRAKE
Filed Jan. 23, 1930　　　3 Sheets-Sheet 2

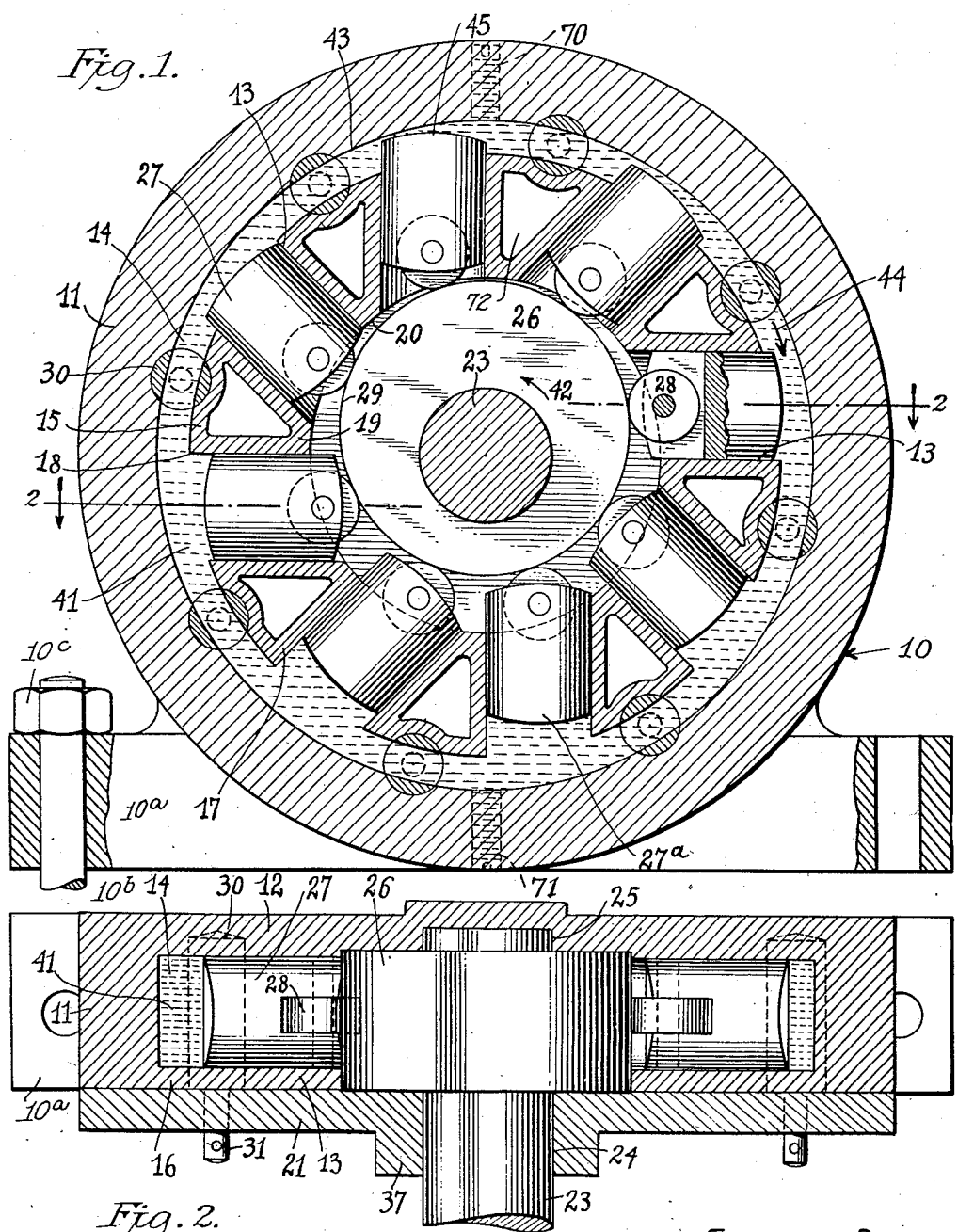

STEPHEN BARTON,
INVENTOR,
BY Julian J. Wittal,
his ATTORNEY

Nov. 8, 1932.    S. BARTON    1,886,624
ROTARY TRANSMISSION OR BRAKE
Filed Jan. 23, 1930    3 Sheets-Sheet 3
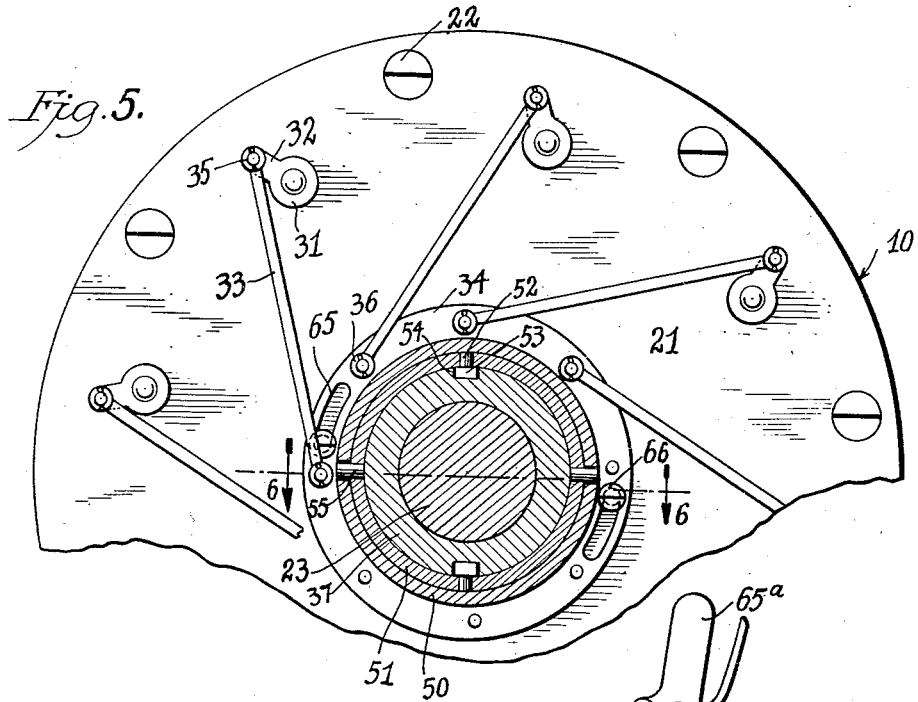
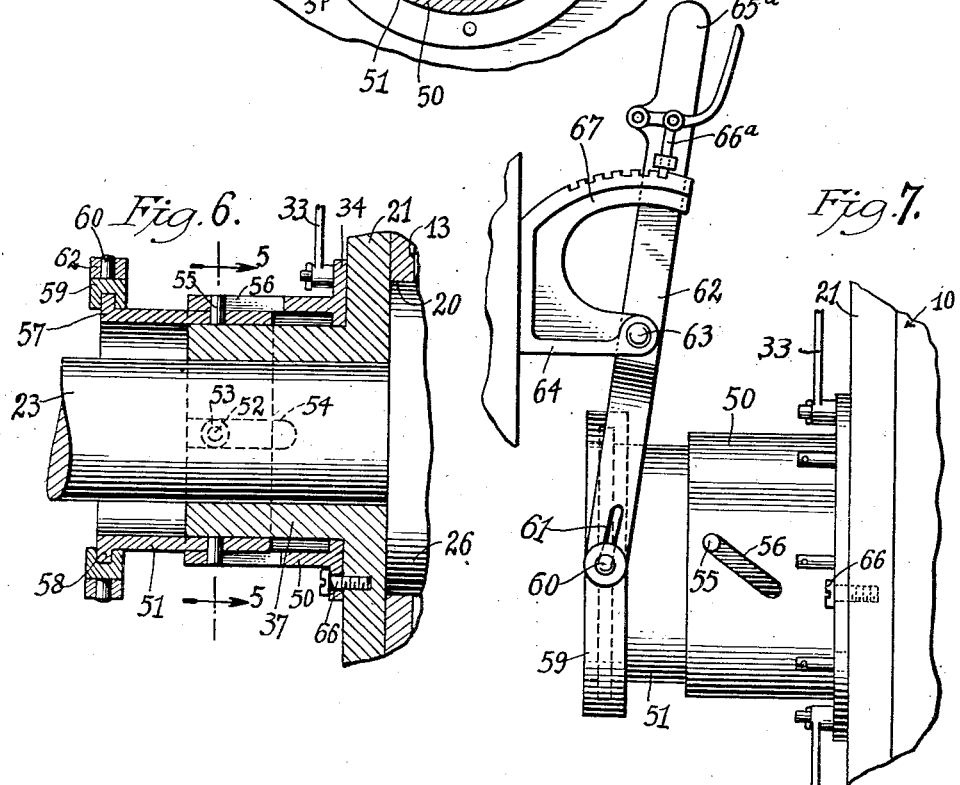
INVENTOR
BY STEPHEN BARTON,
Julian J. Wittal
his ATTORNEY Patented Nov. 8, 1932

1,886,624

UNITED STATES PATENT OFFICE

STEPHEN BARTON, OF ASTORIA, NEW YORK

ROTARY TRANSMISSION OR BRAKE

Application filed January 23, 1930. Serial No. 422,757.

This invention relates to machine elements for transmitting rotary movement from one element to another, or for stopping or braking the movement of a rotary machine element, like a shaft.

The main objects of my invention are: to provide a machine element of the type described which will be efficient elastic, positive in action, reliable, simple in construction, and which will operate according to a novel principle using oil or other fluid as an intermediate agent.

Other objects of my invention will be apparent as this specification proceeds.

In the drawings forming part of this specification:

Fig. 1 is a central vertical sectional view of the main element of my device, while Fig. 2 is a broken horizontal sectional view thereof, the section being taken on the staggered line 2—2 in Fig. 1;

Fig. 3 is a front elevation of one embodiment of my device, while

Fig. 5 is a fragmentary front elevation of a modified form of my device, a portion of the same being shown in section, the section being taken on the line 5—5 of Fig. 6;

Fig. 6 is a fragmentary section of the modification of Fig. 5, the section being taken on the line 6—6 therein, and showing the regulating and control mechanism thereof, while Fig. 7 is a fragmentary elevation of a portion of the modification in Fig. 5, showing a side view of said control and regulating mechanism.

Figure 3:
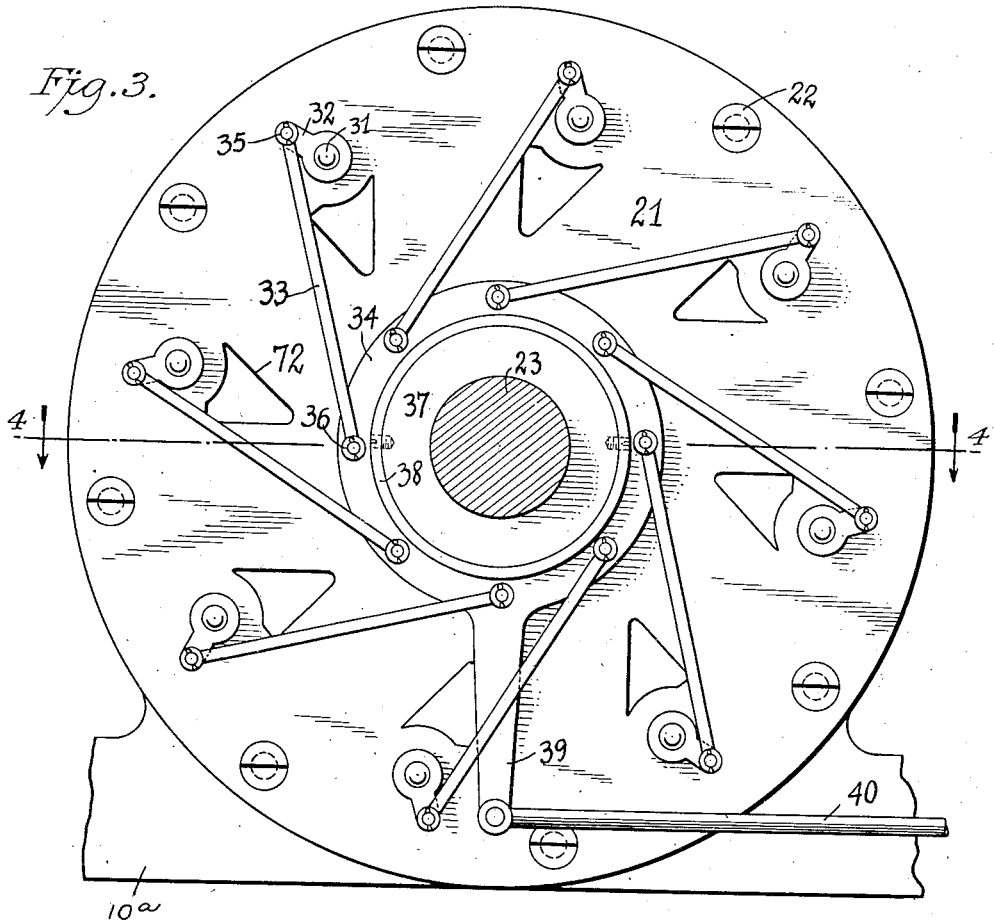

Referring now more closely to the drawings by characters of reference, the numeral 10 indicates a ring form hollow casting being the main body of my device and consisting of an outside circular rim or wall 11, a rear wall 12 integral therewith and entirely closed. Radially, or substantially radially, set cylinders 13 are preferably cast integral with said ring 10 and projecting inwardly therefrom, while a continuous through-going complete channel 14 is provided in said casting adjoining said rim 11 at the outside thereof, and being formed by said rim 11, by an inner wall 15 concentric therewith, by said rear wall 12, and by a front wall 16, the walls 17 of said cylinders 13 projecting inwardly from said inner circular wall 15 and each cylinder opening into said circular channel 14, as indicated at 18. The inner ends of said cylinder walls meet as at 19, the whole system of said cylinders being terminated at the inner end thereof by a lateral cylindrical surface 20.

The front surface of this system of rings and cylinders may be covered by a plate 21, secured thereto by any appropriate means, as by the bolts 22, and a shaft 23 is arranged in the center line of said inner cylindrical space 20, being journalled in any appropriate manner, as herein shown, at 24 and 25, in the front and back plates. An excentric disc or cam 26 may be secured on the shaft 23, and snugly slidable, but otherwise loose, pistons 27 may be arranged in the cylinders 13, each of said pistons having a roller 28 arranged at its inner end, adapted to all the time run on the outer surface 29 of the cam 26.

Rotary valves 30 are set in the channel 14 between each two cylinders 13, each of said valves having a pin 31 extending through the wall 21 carrying an operating arm 32, each arm being connected by a link rod 33 to a ring 34. The ends 35 and 36 of said rods are hingedly secured on said arms 32 and said ring 34, respectively. Said ring 34 is rotatably arranged on a projecting hub 37 of the front wall 21 and a securing ring 38 may be fastened on the front end of said hub to keep said ring 34 in its place. As shown in Fig. 3, in one embodiment of my device, ring 34 may have extension arm 39 integral therewith, to which is hingedly connected a pull rod 40.

The embodiment of my device illustrated in said Figs. 1 to 4 and described hereinbefore is constructed to act as a brake mechanism. To understand the operation thereof, for such a purpose, the outer ring or casting 10 and its associated cylinders, pistons, valves, cover plate, and rings are to be understood as being fixed and stationary which may be attained by any appropriate means well known in the art, while the shaft 23 and its cam 26 are rotatable, receiving their rotary motion from any appropriate source. One method to make the casting 10 stationary may consist in providing thereon the lugs 10a which may be secured to a stationary base 10b for my brake by the bolts 10c. When it is desired to permit the shaft 23 to freely rotate the valves 30 are set into their fully opened positions shown in Fig. 1 and it will be understood that the inner channel 14 and as much of the inner spaces of the cylinders 13, as are communicating with said channel 14, and not being occupied by the pistons 27, are all filled with one continuous liquid medium 41, preferably oil.

If we imagine that the shaft 23 and its cam 26 are rotating in the direction of arrow 42, the cam will continuously push the successive pistons 27 outwardly to their outermost positions when they touch the inner surface 43 of the ring 11, constituting the outer limit of the channel 14, and, in a similar manner, said cam will permit said pistons to successively and gradually return to their innermost positions, shown by about the position of the piston indicated by the numeral 27a in Fig. 1. The constant rotation of the cam 26 will cause said pistons to execute radial outward and inward movements and to push the oil from their respective cylinders 13 into the channel 14, or vice versa, to permit said oil to flow from said channel into the freed portions of the respective cylinders. If the shaft and cam are imagined as rotating in a counter clockwise direction, as indicated by the arrow 42 the cylinders in the forward direction preceding such movement will be gradually pushed outwardly, while the cylinders in the rear of such motion will gradually be permitted to recede, and it will be obvious that this play will ultimately cause the oil to rotate in its channel 14 in a clockwise direction, as indicated by the arrow 44. This flow of the oil in a clockwise direction may also be facilitated and aided by the rounded outer surface 45 of said pistons and by the setting of said cylinders and pistons at a slightly deviating position in a clockwise direction from the exactly radial direction, as is also shown in Fig. 1.

It will be obvious that in the condition herein described the shaft 23 will be permitted to freely rotate. If, however, the valves 30 are gradually closed, by turning them crosswise to the channel 14, increasing resistance is set against the clockwise stream of the oil, and, finally, when said valves are fully closed, the free flowing of the oil will be entirely stopped preventing any movement of the pistons, or the cam and its shaft, and since the whole system of said cylinders and pistons, and their outer ring 11, is stationary and fixed, the rotation of the shaft 23 will be gradually slowed and finally entirely stopped.

My device, therefore, will act as a novel, efficient and reliable brake for slowing down and entirely stopping the rotation of shaft 23.

Figure 4:
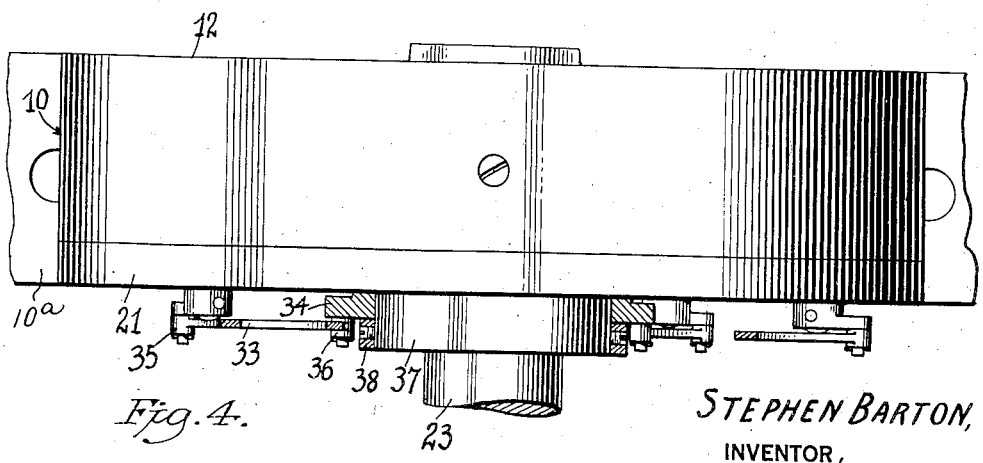
Fig. 4 is a plan view thereof, portions of the same being in section.

It will be obvious by inspecting Figs. 3 and 4 that this braking action or the release thereof may be executed in a simple and regulated manner by the pull rod 40 acting on the ring 34 through the arm 39 thereof.

The Figs. 5, 6 and 7 illustrate a partly modified form of my device which may be used in case the same is not employed as a brake, but as a machine element for the transmission of rotary movement from the shaft 23 to the ring 11, or vice versa. The modification for this purpose relates only to the ring 34, used to operate the valves 30, and to its associated parts.

In this modification the ring 34 has a sleeve like extension hub 50 encircling the hub 37 and being spaced apart therefrom. A second sleeve 51 is slidably placed between the hub 37 and sleeve 50 and is prevented from rotary movement by the inwardly projecting pins 52 having enlarged heads 53 operating in slots 54 in the hub 37. Two further outward projecting pins 55 are also secured in said sleeve 51 cooperating with the inclined slots 56 in said first sleeve 50. The outer end 57 of the sleeve 51 is formed with a circular flange 58 which is rotatable in a corresponding channel of a stationary ring 59. Said ring 59 has two outwardly projecting pins 60, engaged in a slot 61 in the lower end of a regulating or control arm 62, of the usual construction well known to those versed in the art, rockable around a pin 63 of a suitable stationary element 64, being operated by its handle 65a, and released from or secured in any desired position by the stop member 66a cooperating with the toothed segment 67, as will be obvious. Ring 34 has two arcuate slots 65 provided therein cooperating with the headed bolts 66 secured in the front wall 21 of my device, whereby said ring is permitted to rock but prevented from being disengaged from said front wall.

The modifications of the ring 34 and its associate parts, described hereinbefore enable my device to be used for the transmission of a rotary movement from one element to the other, instead of using one of them as a brake for the other one, and it operates as follows: Shaft 23 is understood to be connected with a source of power whereby it is rotated when desired, while the ring casting 10 and its associated parts are connected with a mechanism which it is the object of my invention to connect to the said source of power, or to disconnect therefrom, for the sake of imparting a rotary motion to the same or to cause the same to remain inactive. When it is desired to permit the shaft 23 to rotate without transmitting its motion to the ring casting 10 the fixed regulating arm or lever 62 will be moved in one direction, let us say inwardly, whereby pins 55 in the now inwardly moving sleeve 51 will cause, through their actions in the slots 56, the sleeve 50 and with it the ring 34 to rock in a counter-clockwise direction and the link mechanism 33 will cause the valves 30 to fully open, thereby allowing a free flow for the oil 41 and a free rotation for the shaft 23 without causing the rotation of the ring 10.

When, however, the regulating arm 62 is moved in the reverse direction, let us say, outwardly, then sleeves 51 and 50, as well as the ring 34, will describe reverse motions to the one hereinbefore detailed and the valves 30 will be gradually closed. Upon a full closure of the valves the flow of the oil 41 as well as all the movements of the pistons 27 will be stopped and shaft 23 and its cam 26 will be, in a way, securely fastened to the ring 10 and its associated parts, so that the rotation of the shaft 23 will be transmitted to the ring 10, as will be obvious. In such a manner the rotation of the shaft 23 may be gradually transmitted to the system of the ring 10 or it may be disconnected therefrom in a controlled and regulated manner.

It is also obvious that my invention may be used in a reverse manner, namely, to transmit the rotation of the ring 10 to the shaft 23 or to disconnect it from the same when so desired.

My invention may preferably include an upper opening 70, normally closed as by a screw plug through which it may be filled with oil and a similar lower opening 71 through which the oil may be drained therefrom.

The front and rear plates of my device may be provided with openings 72 between each two adjacent cylinders for the better ventilation and cooling of the device.

It will be understood that changes and variations may be made in the parts and combinations of my device and I hereby reserve my rights to any and all such changes and modifications as are within the spirit of the invention and the scope of the appended claim.

What I claim as new, is:

In a mechanism having a shaft, a ring therearound with a liquid channel therein and a plurality of substantially radial cylinders communicating with said channel, each cylinder having a piston; a cam on said shaft operating said pistons, said mechanism also having control means in said channel between each two cylinders, said channel and cylinders being of one integral body having throughgoing ventilating openings between each pair of cylinders, said cylinders and pistons inclining from a true radial direction rearwardly in relation to the direction of rotation of said shaft, and said pistons having similarly rearwardly declining convex bottoms operating in said channel.

Signed at New York, in the county of New York and State of New York, this 20th day of January, 1930.

STEPHEN BARTON.